US011869730B2

(12) United States Patent
Ning et al.

(10) Patent No.: US 11,869,730 B2
(45) Date of Patent: Jan. 9, 2024

(54) KEYCAP SUPPORT MECHANISM AND KEYSWITCH STRUCTURE

(71) Applicant: DARFON ELECTRONICS CORP., Taoyuan (TW)

(72) Inventors: Li-Yen Ning, Taoyuan (TW); Jui-Yi Huang, Taoyuan (TW)

(73) Assignee: DARFON ELECTRONICS CORP., Taoyuan (TW)

(*) Notice: Subject to any disclaimer, the term of this patent is extended or adjusted under 35 U.S.C. 154(b) by 0 days.

(21) Appl. No.: 17/884,588

(22) Filed: Aug. 10, 2022

(65) Prior Publication Data

US 2023/0084860 A1 Mar. 16, 2023

Related U.S. Application Data

(60) Provisional application No. 63/244,265, filed on Sep. 15, 2021.

(30) Foreign Application Priority Data

Jun. 2, 2022 (TW) ................................. 111120543

(51) Int. Cl.
*H01H 13/14* (2006.01)
*H01H 13/04* (2006.01)
*H01H 13/20* (2006.01)

(52) U.S. Cl.
CPC ............ *H01H 13/14* (2013.01); *H01H 13/04* (2013.01); *H01H 13/20* (2013.01)

(58) Field of Classification Search
CPC ........ H01H 13/14; H01H 13/04; H01H 13/20; H01H 3/12; H01H 3/122; H01H 3/125;
(Continued)

(56) References Cited

U.S. PATENT DOCUMENTS 3,720,801 A 3/1973 Yanaga
6,100,482 A 8/2000 Koma
(Continued)

FOREIGN PATENT DOCUMENTS

CN 201673833 U 12/2010
CN 102364653 A 2/2012
(Continued)

OTHER PUBLICATIONS

Lin, the specification, including the claims, and drawings in the U.S. Appl. No. 17/979,790, filed Nov. 3, 2022.

*Primary Examiner* — Lheiren Mae A Caroc
(74) *Attorney, Agent, or Firm* — Winston Hsu

(57) ABSTRACT

A keyswitch structure includes a base plate, a keycap, and a keycap support mechanism that supports the keycap above the base plate in a vertical direction. The keycap and the keycap support mechanism extend lengthwise in a lengthwise direction. The keycap support mechanism includes an outer support and an inner support pivotally connected to each other. The outer support surrounds the inner support. The inner support includes a support body and a reinforcement part. The reinforcement part is embedded in the support body. The reinforcement part is greater in elastic modulus than the support body. The inner support defines a side connection section on both sides of the inner support in the lengthwise direction. Each side connection section includes at least one base plate connecting portion and at least one keycap connecting portion. The reinforcement part extends into the two side connection sections.

20 Claims, 7 Drawing Sheets

(58) Field of Classification Search
CPC ... H01H 13/70; H01H 13/705; H01H 13/7065
See application file for complete search history.

(56) References Cited

U.S. PATENT DOCUMENTS

| | | | | |
|---|---|---|---|---|
| 6,713,700 | B2 * | 3/2004 | Hsu | H01H 3/125<br>200/344 |
| 8,080,744 | B2 * | 12/2011 | Yeh | H01H 3/125<br>200/5 A |
| 9,455,096 | B2 * | 9/2016 | Chen | H01H 3/125 |
| 9,455,097 | B2 | 9/2016 | Chen | |
| 10,153,100 | B2 | 12/2018 | Yen | |
| 10,325,735 | B2 | 6/2019 | Yen | |
| 10,796,861 | B2 | 10/2020 | Chen | |
| 11,676,780 | B1 | 6/2023 | Ku | |
| 2012/0298495 | A1 | 11/2012 | Zhang | |
| 2018/0025857 | A1 | 1/2018 | Yen | |
| 2019/0096602 | A1 | 3/2019 | Yen | |
| 2022/0189715 | A1 | 6/2022 | Hsu | |

FOREIGN PATENT DOCUMENTS

| | | | |
|---|---|---|---|
| CN | 202523584 | U | 11/2012 |
| CN | 102364653 | B | 1/2014 |
| CN | 107658155 | A | 2/2018 |
| CN | 213184071 | U | 5/2021 |
| CN | 215008015 | U | 12/2021 |
| TW | 541552 | | 7/2003 |
| TW | M354797 | | 4/2009 |
| TW | M386584 | U | 8/2010 |
| TW | M434981 | U1 | 8/2012 |
| TW | I600041 | B | 9/2014 |
| TW | M542226 | U | 5/2017 |
| TW | I680480 | B | 12/2019 |
| TW | I744151 | B | 10/2021 |

* cited by examiner

KEYCAP SUPPORT MECHANISM AND KEYSWITCH STRUCTURE

CROSS REFERENCE TO RELATED APPLICATIONS

This application claims the benefit of U.S. Provisional Application No. 63/244,265, filed on Sep. 15, 2021. The content of the application is incorporated herein by reference.

BACKGROUND OF THE INVENTION

1. Field of the Invention

The present invention relates to a keyswitch structure, and more particularly to a keyswitch structure and a keycap support mechanism.

2. Description of the Prior Art

The main structure of the current mechanical keyswitch structure is that a lift mechanism is connected between the keycap and the base plate, so that the keycap can move up and down relative to the base plate. The movement steadiness of the keycap, including the movement stroke and smoothness, usually depends on the lift mechanism. When the movement steadiness of the lift mechanism itself is poor, it is difficult for the keycap to move steadily. For multi-size keys, such as space bar, Enter, Shift, CapsLock, Ctrl, etc., a plurality of lift mechanisms are generally used to jointly support the keycap. In this structure configuration, each lift mechanism operates independently. When the keycap is pressed, the keycap is not easy to move up and down horizontally and is easy to be skewed, resulting in poor triggering of the switch of the keyswitch structure. For this issue, a balance bar can be added to be connected to the keycap and the base plate independently of the lift mechanism, so as to improve the levelness of the keycap when moving up and down. However, the disposition of the balance bar reduces the installation space of the lift mechanism, so it may affect the structural rigidity and movement steadiness of the lifting mechanism to a certain extent. In addition, the lift mechanism is generally made of plastic. When the keyswitch structure adopts a low profile design, its components will be thinned in structure, resulting in insufficient rigidity of the components themselves, and the above problems will be more serious.

SUMMARY OF THE INVENTION

An objective of the invention is to provide a keycap support mechanism, whose inner support has a reinforcement part so that the structural rigidity of the keycap support mechanism increases and the movement steadiness thereof can also be improved.

A keycap support mechanism according to the invention is used for supporting a keycap above a base plate in a vertical direction. The keycap extends lengthwise in a lengthwise direction perpendicular to the vertical direction. The keycap support mechanism as a whole extends lengthwise in the lengthwise direction. The keycap support mechanism includes an outer support and an inner support. The outer support and the inner support are pivotally connected around a rotation axis. The rotation axis is parallel to the lengthwise direction. The outer support surrounds the inner support. The inner support includes a support body and a reinforcement part. The reinforcement part is embedded into the support body. An elastic modulus of the reinforcement part is greater than an elastic modulus of the support body. The inner support defines a side connection section on both sides of the inner support in the lengthwise direction. Each side connection section includes at least one base plate connecting portion and at least one keycap connecting portion. The reinforcement part extends into the two side connection sections, so that the structural rigidity of the inner support at the two side connection sections is effectively improved. Therefore, the structural rigidity of the keycap support mechanism is increased, and the movement steadiness can also be improved, so that the keycap can move steadily up and down relative to the base plate. The keycap support mechanism is also suitable for low profile designs.

Another objective of the invention is to provide a keyswitch structure, whose keycap support mechanism has an inner support that has a reinforcement part so that the structural rigidity of the keycap support mechanism increases and the movement steadiness thereof can also be improved.

A keyswitch structure according to the invention includes a base plate, a keycap, and a keycap support mechanism. The keycap extends lengthwise in a lengthwise direction. The keycap support mechanism supports the keycap above the base plate in a vertical direction. The vertical direction is perpendicular to the lengthwise direction. The keycap support mechanism includes an outer support and an inner support. The outer support and the inner support are pivotally connected around a rotation axis. The rotation axis is parallel to the lengthwise direction. The outer support surrounds the inner support. The inner support includes a support body and a reinforcement part. The reinforcement part is embedded into the support body. An elastic modulus of the reinforcement part is greater than an elastic modulus of the support body. The inner support defines a side connection section on both sides of the inner support in the lengthwise direction. Each side connection section includes at least one base plate connecting portion and at least one keycap connecting portion. The reinforcement part extends into the two side connection sections, so that the structural rigidity of the inner support at the two side connection sections is effectively improved. Therein, in each side connection section, the at least one base plate connecting portion is connected to the base plate, and the at least one keycap connecting portion is connected to the keycap. Therefore, the structural rigidity of the keycap support mechanism is increased, and the movement steadiness can also be improved, so that the keycap can move steadily up and down relative to the base plate. The keycap support mechanism is also suitable for low profile designs.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
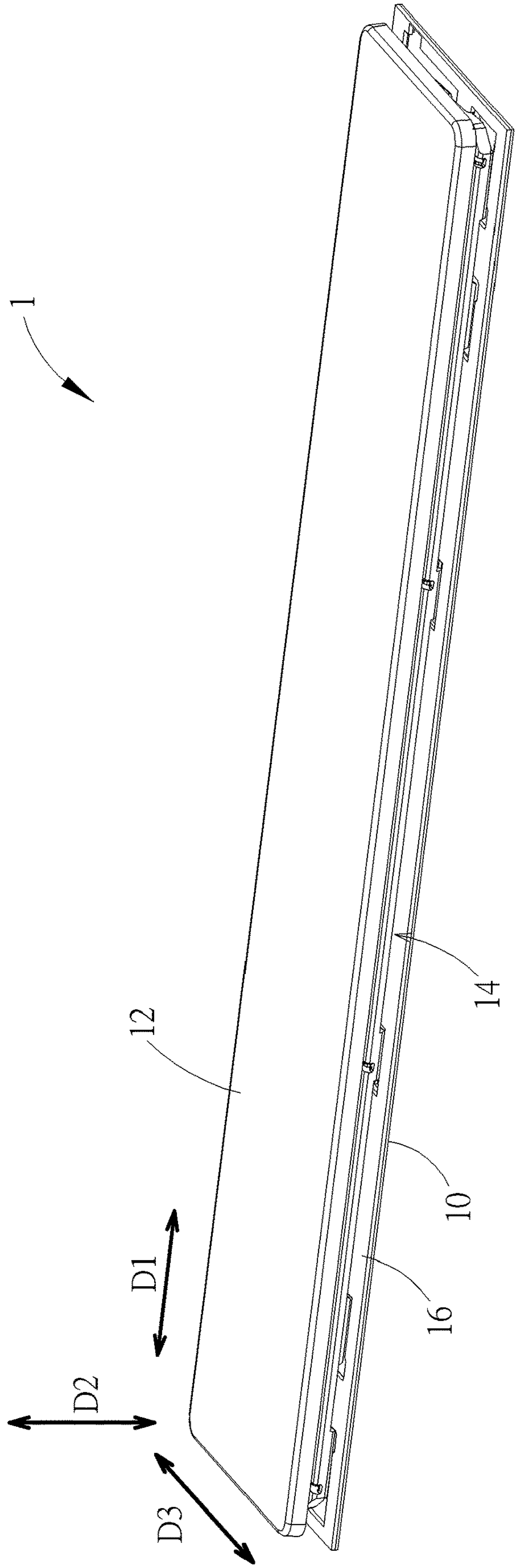
FIG. 1 is a schematic diagram illustrating a keyswitch structure according to an embodiment.
Figure 2:
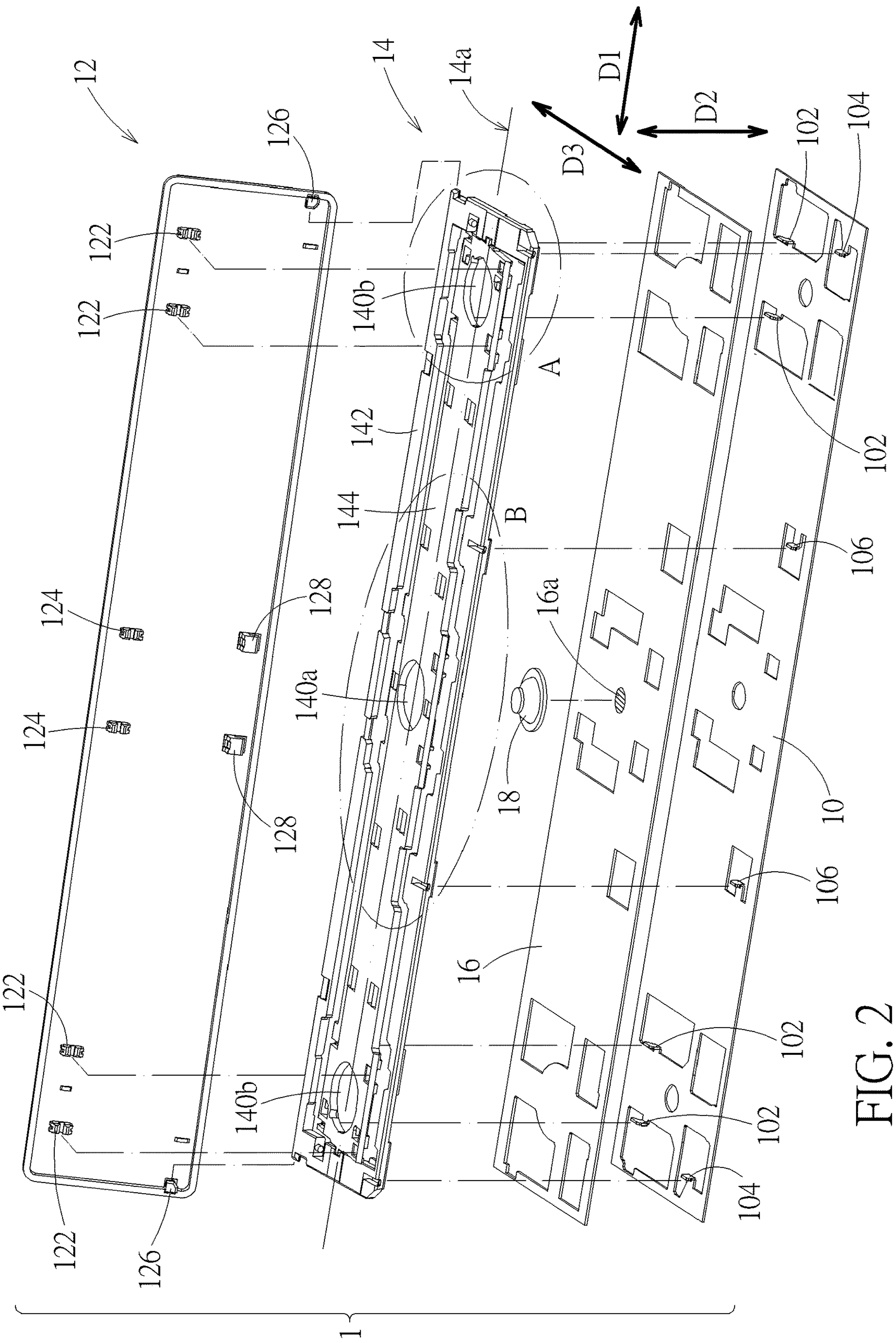
FIG. 2 is an exploded view of the keyswitch structure in FIG. 1.
Figure 3:
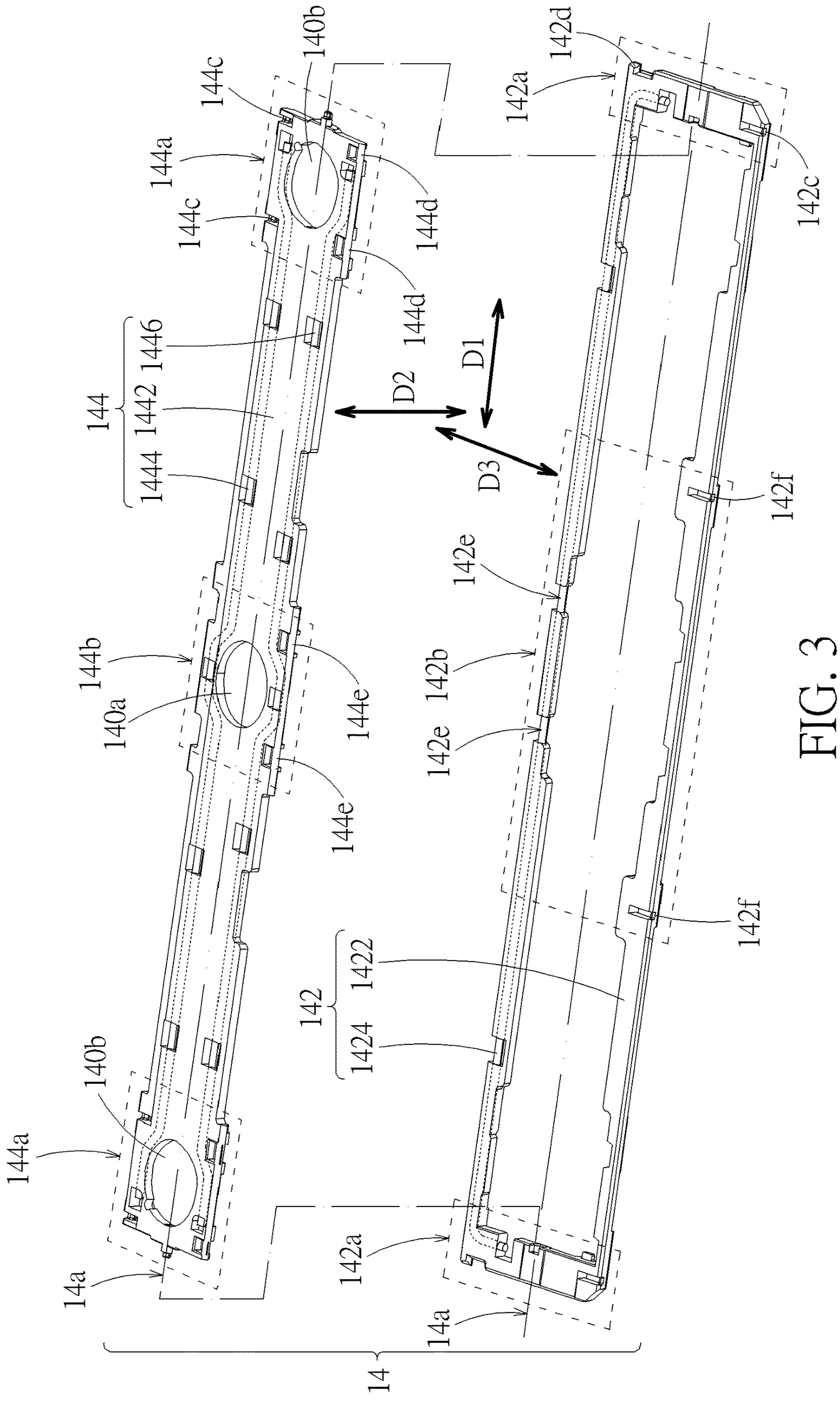
FIG. 3 is an enlarged view of a keycap support mechanism in FIG. 2.

Please refer to FIG. 1 to FIG. 3. A keyswitch structure 1 according to an embodiment includes a base plate 10, a keycap 12, a keycap support mechanism 14, a switch circuit board 16, and an elastic part 18. The keycap 12 extends lengthwise in a lengthwise direction D1 (i.e. the direction parallel to a long side thereof, indicated by a dual-head arrow in figures). The keycap support mechanism 14 as a whole extends lengthwise in the lengthwise direction D1. The keycap support mechanism 14 is connected to and between the keycap 12 and the base plate 10, so as to support the keycap 12 above the base plate 10 in a vertical direction D2 (indicated by a dual-head arrow in figures). The lengthwise direction D1, a widthwise direction D3 (i.e. the direction parallel to a short side of the keycap 12, indicated by a dual-head arrow in figures), and the vertical direction D2 are perpendicular to each other. The switch circuit board 16 is stacked on the base plate 10. The switch circuit board 16 has a switch 16*a* (shown by a hatched circle in FIG. 1). The switch circuit board 16 can be realized by but not limited to a membrane circuit (which is a three-layer structure in practice; therein, a switch circuit is formed on upper and lower layers thereof, an insulating layer is sandwiched between the upper and lower layers). The elastic part 18 is disposed on the switch circuit board 16 corresponding to the switch 16*a* and passes through the keycap support mechanism 14 (through an opening 140*a* thereof). The elastic part 18 can be but not limited thereto a rubber dome. The keycap 12 can move up and down relative to the base plate 10 through the keycap support mechanism 14. The keycap 12 can be pressed downward to squeeze the elastic part 18 so as to trigger the switch 16*a*. A resilient force produced by the elastically deformed elastic part 18 can push up against the keycap 12 to return to its original position. Furthermore, in practice, it is practicable to dispose elastic parts corresponding to openings 140*b* (i.e. passing to the openings 140*b*) at two sides of the keycap support mechanism 14 on the switch circuit board 16. Similarly, the elastic parts also can be squeezed by the keycap 12 and accordingly produce resilient forces to return the keycap 12 to its original position. Furthermore, the switch circuit board 16 also can have switches corresponding to the elastic parts for the elastic parts to trigger.

Figure 4:
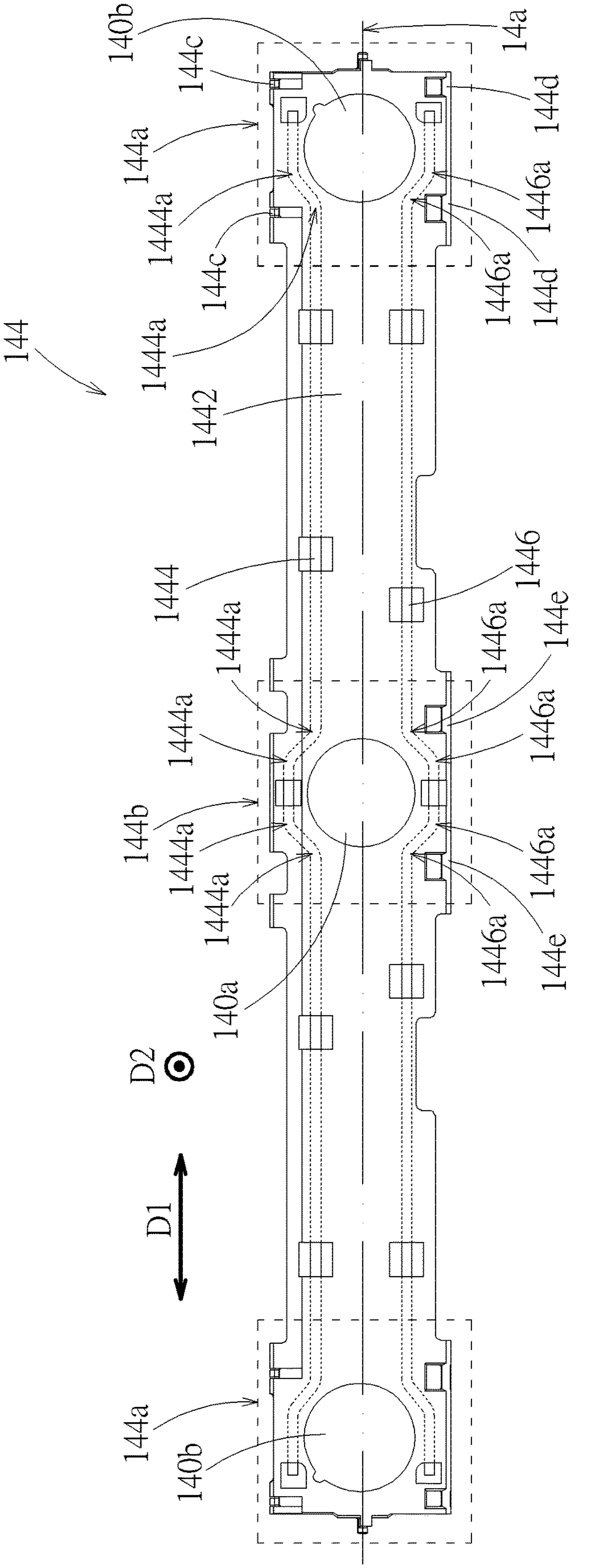
FIG. 4 is a top view of an inner support of the keycap support mechanism in FIG. 2.
Figure 5:
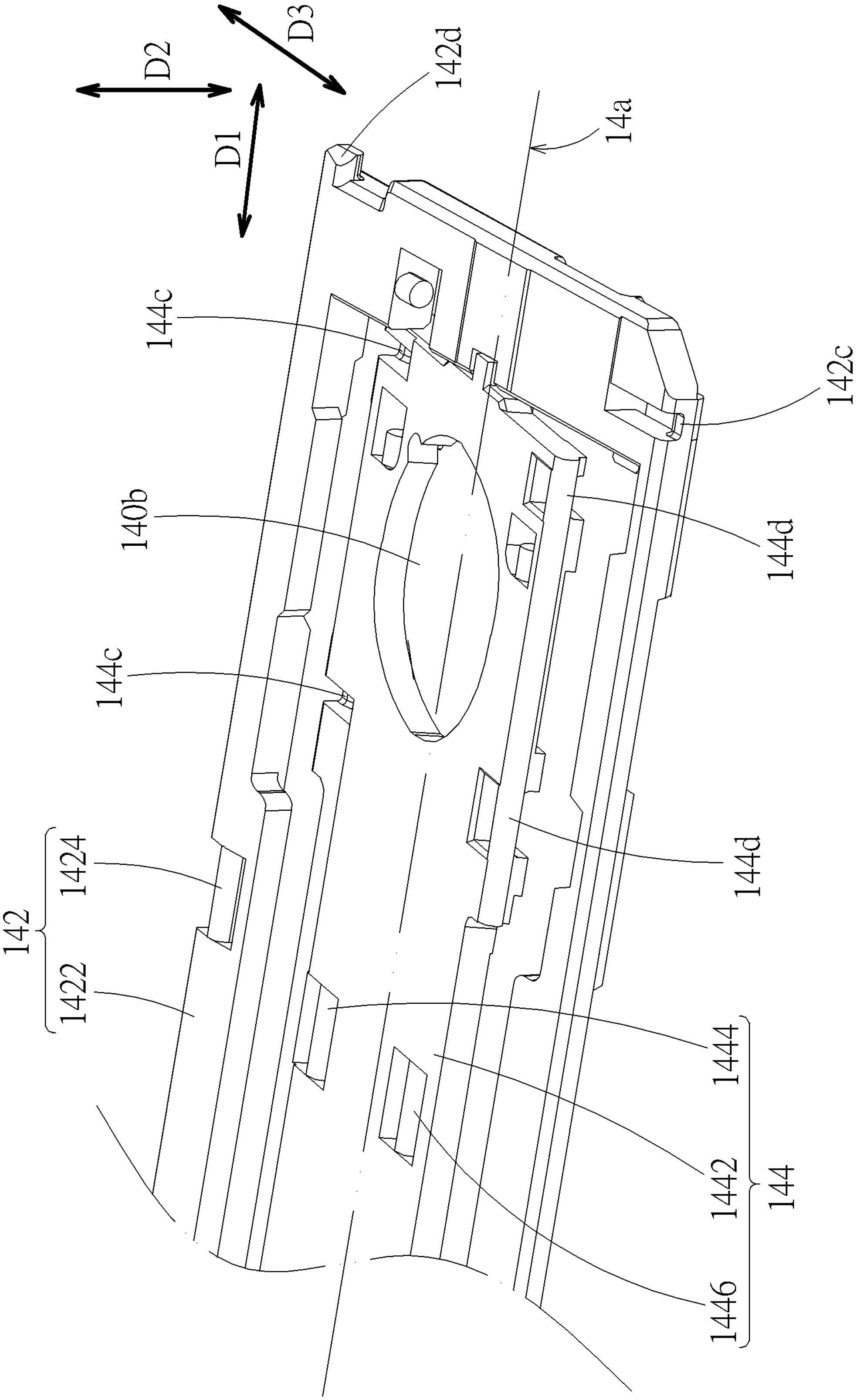
FIG. 5 is an enlarged view of the circle A in FIG. 2.
Figure 6:
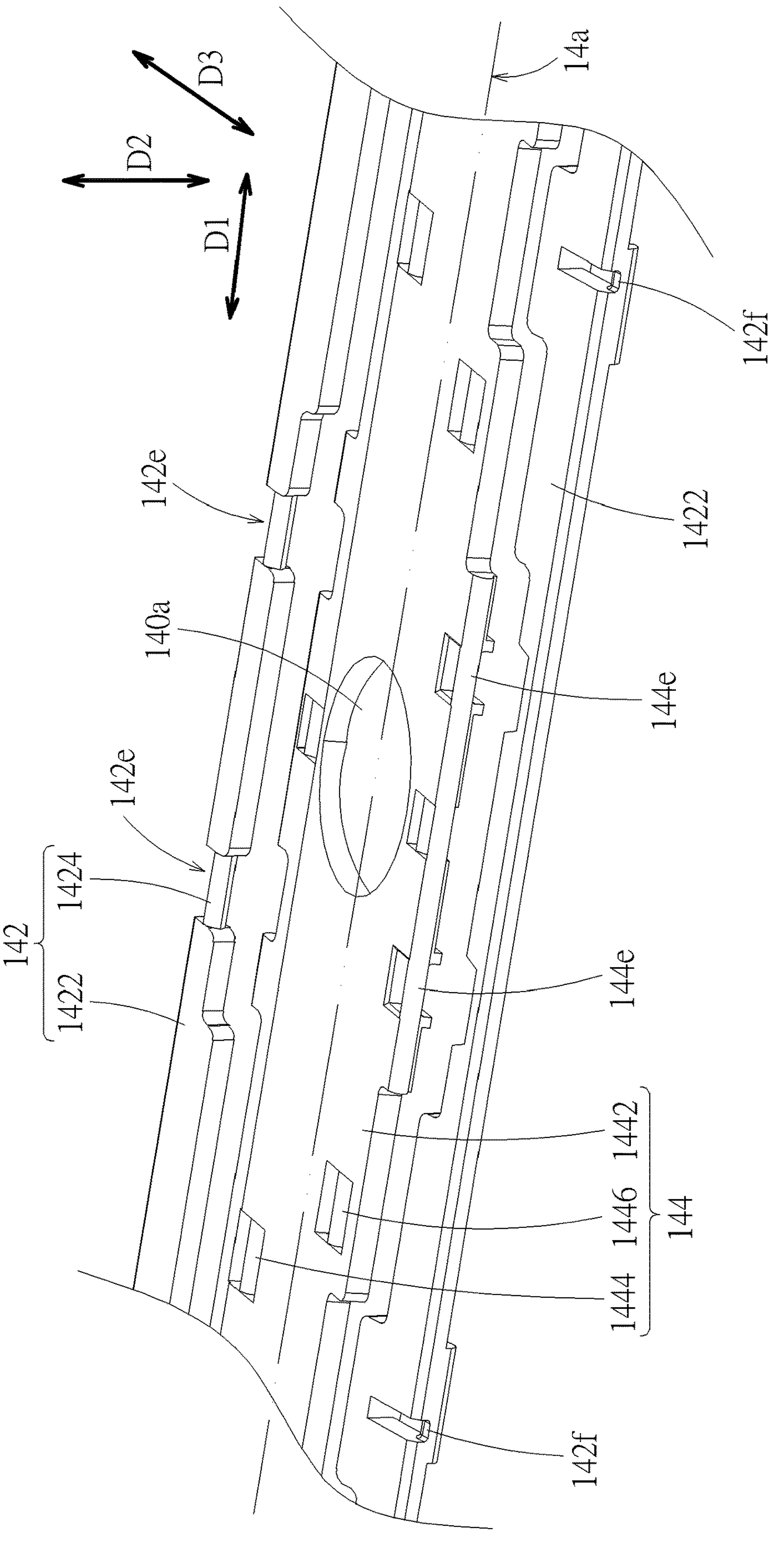
FIG. 6 is an enlarged view of the circle B in FIG. 2.
Figure 7:
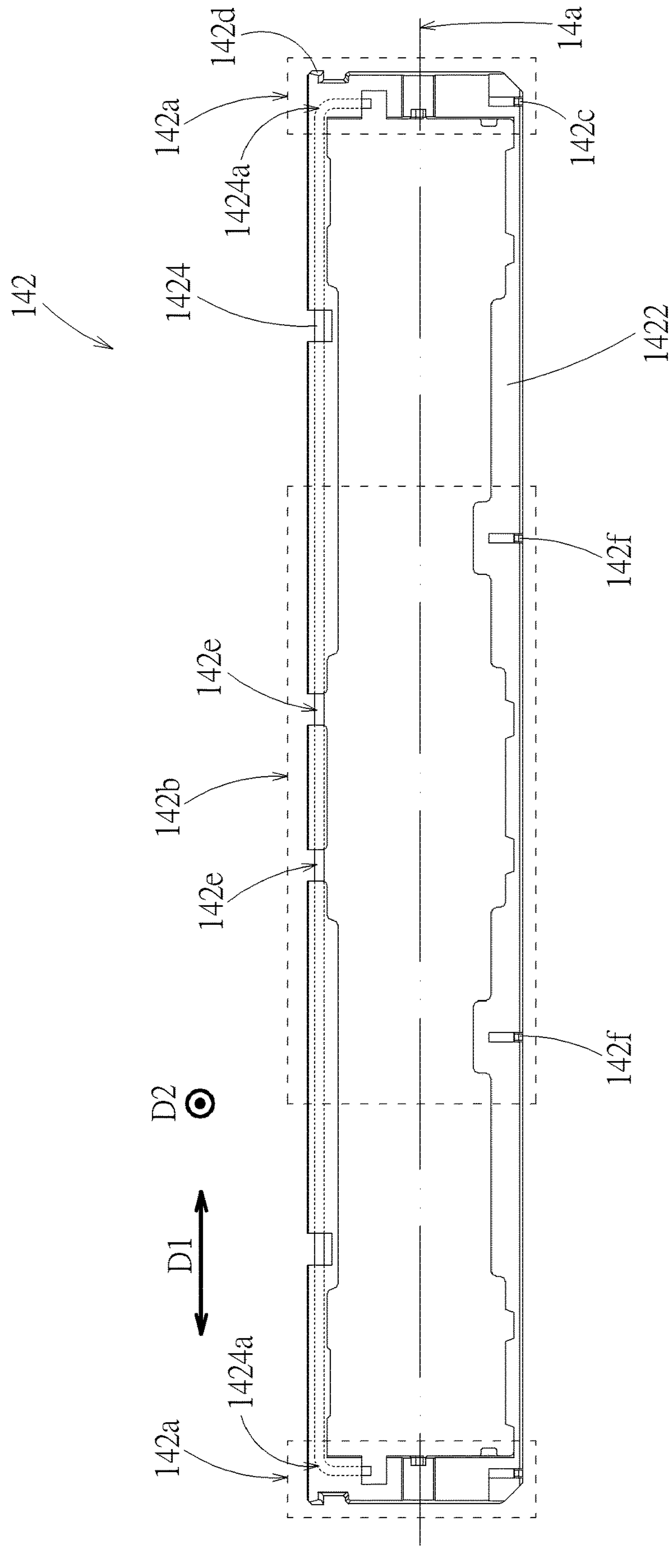
FIG. 7 is a top view of an outer support of the keycap support mechanism in FIG. 2.

Furthermore, in the embodiment, the keycap support mechanism 14 includes an outer support 142 and an inner support 144. The outer support 142 and the inner support 144 are pivotally connected around a rotation axis 14*a* (indicated by a chain line in the figures). The outer support 142 surrounds the inner support 144. The rotation axis 14*a* is parallel to the lengthwise direction D1. The outer support 142 and the inner support 144 are respectively connected to and between the keycap 12 and the base plate 10. Please refer to FIG. 2 to FIG. 6. The inner support 144 includes a first support body 1442, a first reinforcement part 1444, and a second reinforcement part 1446 (in FIG. 3 and FIG. 4, the hidden profiles of the first reinforcement part 1444 and the second reinforcement part 1446 are shown in dashed lines). The first support body 1442 forms openings 140*a* and 140*b*. The first reinforcement part 144 is embedded into the first support body 1442. The elastic modulus of the first reinforcement part 1444 is greater than the elastic modulus of the first support body 1442, so that compared with the first support body 1442, the first reinforcement part 1444 can improve the overall structural rigidity of the inner support 144 and thereby improve the overall structural rigidity of the keycap support mechanism 14. In practice, for example, the first support body 1442 can be a polymer part (e.g. but not limited to made of thermoplastics). The first reinforcement part 1444 and the second reinforcement part 1446 can respectively be a metal bar (e.g. but not limited to stainless steel bars or copper bars). The combination of the first support body 1442 with the first reinforcement part 1444 and the second reinforcement part 1446 can be realized by insert molding.

The inner support 144 defines a first side connection section 144*a* (indicated by a dashed frame in the figure) on both sides of the inner support 144 in the lengthwise direction D1. The inner support 144 also defines a first middle connection section 144*b* (indicated by a dashed frame in the figure) in the lengthwise direction D1. The first middle connection section 144*b* is located between the two first side connection sections 144*a* in the lengthwise direction D1. The inner support 144 is connected to the base plate 10 and the keycap 12 through the first side connection sections 144*a* and the first middle connection section 144*b*, respectively. Therein, each first side connection section 144*a* includes two base plate connecting portions 144*c* and two keycap connecting portions 144*d*. The base plate connecting portions 144*c* are connected to the base plate 10 (or the connecting portions 102 thereof). The keycap connecting portions 144*d* are connected to the keycap 12 (or the connecting portions 122 thereof). The first middle connection section 144*b* includes two keycap connecting portions 144*e*. The keycap connecting portions 144*e* are connected to the keycap 12 (or the connecting portions 124 thereof). In practice, the numbers of the base plate connecting portions 144*c* and the keycap connecting portions 144*d* and 144*e* in each of the sections 144*a* and 144*b* is determined by design and is not limited to the embodiment. For example, a sum of the base plate connecting portions 144*c* and the keycap connecting portions 144*d* of the first side connection section 144*a* is greater than or equal to three in number. For another example, the middle connection section 144*b* also includes a base plate connecting portion.

Furthermore, in the inner support 144, the first reinforcement part 1444 and the second reinforcement part 1446 extend substantially parallel to lengthwise direction D1. The first reinforcement part 1444 and the second reinforcement part 1446 pass through the first middle connection section 144*b* and extend into the first side connection sections 144*a*. Such structure configuration helps to improve the consistency of the structural rigidity of the inner support 144 in the lengthwise direction D1, and also helps the inner support 144 to effectively transfer stress in the lengthwise direction D1. Besides, the structure configuration can also directly increase the structural rigidity of the inner support 144 at each section 144*a* and 144*b*, so as to improve the stability of the connection of the inner support 144 with the base plate 10 and the keycap 12. In the embodiment, the first reinforcement part 1444 and the second reinforcement part 1446 are located at two sides of the rotation axis 14*a*, so that the structural reinforcement of the inner support 144 by the first reinforcement part 1444 and the second reinforcement part 1446 extends to the four corners of the inner support 144. The structure configuration helps to improve the consistency of the structural rigidity of the inner support 144, so that the upper and lower sides of the first support body 1442 (i.e. the side connected to the keycap 12 and the side connected to the base plate 10) have the structural reinforcement effect, which helps to enhance the reinforcement of the base plate connecting portions 144*c* and the keycap connecting portions 144*d* and 144*e* of each section 144*a* and 144*b*, so as to further improve the stability of the connection of the inner support 144 with the base plate 10 and the keycap 12.

Furthermore, in the embodiment, the first reinforcement part 1444 and the second reinforcement part 1446 have the same material and are structurally symmetrical with respect to the rotation axis 14*a*, but are not limited thereto in practice. In addition, in the inner support 144, the first reinforcement part 1444 has bent portions 1444*a* in a plurality of places, so that the first reinforcement part 1444 is not only extended in a single linear direction, and this structure can enhance the reinforcement effect on the first support body 1442. The bent portion 1444*a* surrounds at least a part of the periphery of the opening 140*a*, which can reduce the influence of the opening 140*a* on the structural strength of the inner support 144. Furthermore, the first side connection sections 144*a* and the middle connection section 144*b* are provided with bent portions 1444*a*, which can further enhance the reinforcement of the first side connection sections 144*a* and the middle connection section 144*b*, and also improve the stability of the connection of the inner support 144 with the base plate 10 and the keycap 12. Besides, the bent portions 1444*a* are also disposed adjacent to the opening 140*b*, which can also reduce the influence of the opening 140*a* on the structural strength of the inner support 144. In addition, the second reinforcement part 1446 also has the same situation, which will not be repeated. Furthermore, at the opening 140*a*, the bent portions 1444*a* of the first reinforcement part 1444 and the bent portions 1446*a* of the second reinforcement part 1446 are arranged together around the opening 140*a*, which facilitates force transfer in the widthwise direction D3 (referring to FIG. 2). Therefore, the first reinforcement part 1444 and the second reinforcement part 1446 together strengthen the structure of the inner support 144. During the pressing on the keycap 12, the inner support 144 can steadily transfer the force in both the lengthwise direction D1 and the widthwise direction D3 without deformation.

Furthermore, in the embodiment, the base plate 10 can be a metal plate. The keycap 12 can be a polymer part (e.g. made of thermoplastics). The base plate connecting portion 144*c* of the inner support 144 is formed mainly by the first support body 1442, so that the base plate connecting portion 144*c* is relatively soft compared to the base plate 10 (or the connecting portion 102 thereof), and the relative sliding/rotation and friction between the two will not make obvious sound in principle. In practice, the base plate connecting portion 144*c* can be formed by the first reinforcement part 1444 and the first support body 1442 together. For example, the first reinforcement part 1444 forms a rod portion used for connecting with the connecting portion 102 of the base plate 10; the outer surface of the rod portion can be covered with the first support body 1442, so that the portion of the base plate connecting portion 144*c* which the connecting portion 102 of the base plate 10 contacts is still polymer, so in principle, no obvious sound will occur during relative sliding/rotation and friction. This structure configuration can also increase the structural strength of the base plate connecting portion 144*c*, which is conducive to the stable connection between the base plate connecting portion 144*c* and the connecting portion 102 of the base plate 10.

Furthermore, the keycap connecting portions 144*d* and 144*e* of the inner support 144 are formed mainly by the first support body 1442. The relative sliding/rotation and friction between the keycap connecting portions 144*d* and 144*e* and the keycap 12 (or the connecting portions 122 and 124 thereof) will not produce obvious noise in principle. Similarly, in practice, the keycap connecting portions 144*d* and 144*e* can also be formed by the second reinforcement part 1446 and the first support body 1442. For example, the second reinforcement part 1446 forms a rod portion used for connecting with the connecting portion 102 of the base plate 10; the outer surface of the rod portion can be covered with the first support body 1442, so that the portions of the keycap connecting portions 144*d* and 144*e* which the connecting portions 122 and 124 of the base plate 10 contacts are still polymer, so in principle, no obvious sound will occur during relative sliding/rotation and friction. This structure configuration can increase the structural strength of the keycap connecting portions 144*d* and 144*e*, which is conducive to the stable connection between the keycap connecting portions 144*d* and 144*e* and the connecting portions 122 and 124 of the keycap 12. Furthermore, in practice, the keycap connecting portions 144*d* and 144*e* can be formed directly by the second reinforcement part 1446. Although the material of the keycap connecting portions 144*d* and 144*e* is relatively stiffer than that of the connecting portion 102 of the keycap 12, the relative sliding/rotation and friction between the two still will not produce obvious sound in principle. Similarly, such structure configuration can increase the structural strength of the keycap connecting portions 144*d* and 144*e*, which is conducive to the stable connection between the keycap connecting portions 144*d* and 144*e* and the connecting portions 122 and 124 of the keycap 12. In addition, in practice, in the inner support 144, the first reinforcement part 1444 and the second reinforcement part 1446 also can be directly connected to each other to form a single reinforcement part, such as a ring shape, which can also provide the structural strengthening effect to the inner support 144.

Please refer to FIG. 2, FIG. 3, and FIG. 5 to FIG. 7. In the embodiment, the outer support 142 includes a second support body 1422 and a third reinforcement part 1424 (in FIG. 3 and FIG. 7, the hidden profiles of the second support body 1422 and the third reinforcement part 1424 are shown in dashed lines). The third reinforcement part 1424 is embedded into the second support body 1422. The elastic modulus of the third reinforcement part 1424 is greater than the elastic modulus of the second support body 1422, so that compared with the second support body 1422, the third reinforcement part 1424 can improve the overall structural rigidity of the outer support 142 and thereby improve the overall structural rigidity of the keycap support mechanism 14. In practice, for example, the second support body 1422 can be a polymer part (e.g. but not limited to made of thermoplastics). The third reinforcement part 1424 can be a metal bar (e.g. but not limited to stainless steel bars or copper bars). The combination of the second support body 1422 with the third reinforcement part 1424 can be realized by insert molding.

The outer support 142 defines a second side connection section 142*a* (indicated by a dashed frame in the figure) on both sides of the inner support 144 in the lengthwise direction D1. The outer support 142 also defines a second middle connection section 142*b* (indicated by a dashed frame in the figure) in the lengthwise direction D1. The second middle connection section 142*b* is located between the two second side connection sections 142*a* in the lengthwise direction D1. The outer support 142 is connected to the base plate 10 and the keycap 12 through the second side connection sections 142*a* and the second middle connection section 142*b*, respectively. Therein, each second side connection section 142*a* includes a base plate connecting portions 142*c* and a keycap connecting portion 142*d*. The base plate connecting portion 142*c* is connected to the base plate 10 (or the connecting portion 104 thereof). The keycap connecting portion 142*d* is connected to the keycap 12 (or the connecting portion 126 thereof). The second middle connection section 142*b* includes two keycap connecting portions 142*e* and two base plate connecting portions 142*f*. The keycap connecting portions 142*e* are connected to the keycap 12 (or the connecting portions 128 thereof). The base plate connecting portions 142*f* are connected to the base plate 10 (or the connecting portions 106 thereof). Similar to the inner support 144, in practice, the numbers of the base plate connecting portions 124*c* and 142*f* and the keycap connecting portions 142*d* and 142*e* in each of the sections 142*a* and 142*b* are determined by design, which will not be repeated in addition.

Furthermore, in the outer support 142, the third reinforcement part 1424 extends substantially parallel to lengthwise direction D1. The third reinforcement part 1424 passes through the second middle connection section 142*b* and extends into the second side connection sections 142*a*. Such structure configuration helps to improve the consistency of the structural rigidity of the outer support 142 in the lengthwise direction D1, and also helps the outer support 142 to effectively transfer stress in the lengthwise direction D1. The third reinforcement part 1424 has bent portions 1424*a* at two ends thereof in the lengthwise direction D1, so that the third reinforcement part 1424 is not only extended in a single linear direction, and this structure can enhance the reinforcement effect on the second support body 1422. Therein, the bent portions 1424*a* are located at corners of the outer support 142, so that the bent portions 1424*a* can enhance the structural strength of these regions. When any corner of the keycap 12 corresponding to the bent portions 1424*a* is pressed, the bent portion 1424*a* can make the outer support 142 simultaneously and effectively transfer the force in the lengthwise direction D1 and the widthwise direction D3 without losing the pressing force due to deformation. Furthermore, in the embodiment, the bent portions 1424*a* are located in the second side connection sections 142*a* and adjacent to the keycap connecting portions 142*d*, which can increase the structural rigidity of the keycap connecting portions 142*d*, so as to improve the stability of the connection of the outer support 142 with the keycap 12.

Furthermore, in the outer support 142, the base plate connecting portions 142*c* and 142*f*, and the keycap connecting portions 142*d* are formed mainly by the second support body 1422, so that the relative sliding/rotation and friction between the connecting portions 104 and 106 of the base plate 10 and the connecting portions 126 of the keycap 12 will not make obvious sound in principle. The keycap connecting portion 142*e* is formed by a portion of the third reinforcement part 1424 which is exposed from second support body 1422 in the middle connection section 142*b*. Therefore, although the material of the keycap connecting portion 142*e* is relatively stiffer than that of the keycap 12 (or the connecting portion 128 thereof), the relative sliding/rotation and friction between the two still will not produce obvious sound in principle. Such structure configuration can increase the structural strength of the keycap connecting portion 142*e*, which is conducive to the stable connection between the keycap connecting portion 142*e* and the connecting portion 128 of the keycap 12.

In the keycap support mechanism 14, the first reinforcement part 1444, the second reinforcement part 1446, and the third reinforcement part 1424 all have the effect of strengthening the first support body 1442 and the second support body 1422. For other descriptions of the structural reinforcement of the outer support 142, please refer to the relevant descriptions of the first reinforcement part 1444, the second reinforcement part 1446, and the variants thereof, which will not be repeated. In addition, in the embodiment, the outer support 142 is provided with the single reinforcement part 1424; however, it is not limited thereto in practice. For example, the outer support 142 may also include another reinforcement part if the structural size of the outer support 142 allows. Furthermore, if the structural size of the inner support 144 allows, the first reinforcement part 1444 and the second reinforcement part 1446 can also form structures similar to the bent portion 1424*a* (of the third reinforcement part 1424) at their ends, which can further structurally strengthen the corners of the inner support 144.

In addition, please refer to FIG. 1 and FIG. 2. In the keyswitch structure 1, the connecting portions 126 of the keycap 12 (used for connecting with the outer support 142) are disposed on the skirt of the keycap 12, and the connecting portions 122 and 124 (used for connecting with the inner support 144) and the connecting portions 128 (used for connecting with the outer support 142) are disposed adjacent to the skirt of the keycap 12. Therefore, in the vertical direction D2, the outline of the keycap support mechanism 14 is only slightly smaller than that of the keycap 12, so that the keycap support mechanism 14 can support the keycap 12 more stably. Such structure configuration helps the keycap support mechanism 14 to transfer the movement of the keycap 12 in the lengthwise direction D1, that is, to improve the levelness of the keycap 12 when the keycap 12 moves up and down. Furthermore, in the embodiment, the second reinforcement part 1446 and the third reinforcement part 1424 are disposed adjacent to the keycap 12 (in which the third reinforcement part 1424 is connected directly to the connecting portions 128 of the keycap 12), which is conducive to the linkage of the keycap support mechanism 14 to the keycap 12 in the lengthwise direction D1. The second reinforcement part 1446 and the third reinforcement part 1424 are located at two sides of the rotation axis 14*a* in the vertical direction D2, which is conducive to the linkage of the keycap support mechanism 14 to the four corners of the keycap 12, so that in principle, the external pressing force applied to any position on the keycap 12 can be effectively and synchronously transferred to the four corners of the keycap 12, which can eliminate or effectively reduce the inclination degree of the keycap 12 when the keycap 12 moves up and down.

As discussed above, the outer support 142 and the inner support 144 of the keycap support mechanism 14 of the keyswitch structure 1 enhance the structural rigidity thereof through the reinforcement parts 1444, 1446 and 1424. The movement stability of the keyswitch structure 1 can also be improved.

The reinforcement parts 1444, 1446, and 1424 all extend parallel to the lengthwise direction D1, and have a significant horizontal stable supporting effect for long and narrow keycaps (such as the keycap 12), so that when the corner of the keycap 12 is pressed, the keycap support mechanism 14 can indeed transfer the pressing force along the lengthwise direction D1 to the other end of the long side of the keycap 12, and the mutually pivoting structure of the outer support 142 and the inner support 144 can also transfer the pressing force to the other end of the short side of the keycap 12 in the widthwise direction D3 in real time. Thereby, both ends of the long side and both ends of the short side of the keycap 12 can be kept close to the same height and move downward synchronously. Therefore, in practice, the keycap 12 can move steadily up and down relative to the base plate 10 without the aid of a balance bar. Compared with the design of the keyswitch structure in the prior art that includes a balance bar in addition to the lifting mechanism, the keyswitch structure 1 uses fewer supports in number, which can simplify the assembly process and increase the production speed. Furthermore, in the keyswitch structure 1, the structurally reinforced outer support 142 and inner support 144 can improve the structural rigidity without increasing the thickness of the supports 142 and 144, so the keyswitch structure 1 can also be suitable for low profile designs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A keycap support mechanism, for supporting a keycap above a base plate in a vertical direction, the keycap extending lengthwise in a lengthwise direction perpendicular to the vertical direction, the keycap support mechanism as a whole extends lengthwise in the lengthwise direction, the keycap support mechanism comprising:
- an outer support; and
- an inner support, the outer support and the inner support being pivotally connected around a rotation axis, the rotation axis being parallel to the lengthwise direction, the outer support surrounding the inner support, the inner support comprising a first support body and a first reinforcement part, the first reinforcement part being embedded into the first support body, an elastic modulus of the first reinforcement part being greater than an elastic modulus of the first support body, the inner support defining a first side connection section on both sides of the inner support in the lengthwise direction, each first side connection section comprising at least one base plate connecting portion and at least one keycap connecting portion, the first reinforcement part extending into the two first side connection sections.

2. The keycap support mechanism according to claim 1, wherein in one of the first side connection sections, a sum of the at least one base plate connecting portion and the at least one keycap connecting portion is greater than or equal to three in number.

3. The keycap support mechanism according to claim 2, wherein the inner support comprises a second reinforcement part, the second reinforcement part is embedded into the first support body and extends into the two first side connection sections.

4. The keycap support mechanism according to claim 3, wherein the first reinforcement part and the second reinforcement part are located at two sides of the rotation axis.

5. The keycap support mechanism according to claim 4, wherein the first reinforcement part and the second reinforcement part have a same material and are structurally symmetrical with respect to the rotation axis.

6. The keycap support mechanism according to claim 1, wherein the first support body is a polymer part, and the first reinforcement part is a metal bar.

7. The keycap support mechanism according to claim 6, wherein the first reinforcement part has at least one bent portion, located in one of the first side connection sections.

8. The keycap support mechanism according to claim 1, wherein the inner support defines a first middle connection section in the lengthwise direction, the first middle connection section is located between the two first side connection sections in the lengthwise direction, and the first middle connection section comprises a base plate connecting portion or a keycap connecting portion.

9. The keycap support mechanism according to claim 1, wherein the outer support comprises a second support body and a third reinforcement part, the third reinforcement part is embedded into the second support body, an elastic modulus of the third reinforcement part is greater than an elastic modulus of the second support body, the outer support defines a second side connection section on both sides of the outer support in the lengthwise direction, each second side connection section comprises at least one base plate connecting portion and at least one keycap connecting portion, and the third reinforcement part extends into the two second side connection sections.

10. The keycap support mechanism according to claim 9, wherein the outer support defines a second middle connection section in the lengthwise direction, the second middle connection section is located between the two second side connection sections in the lengthwise direction, the second middle connection section comprises a keycap connecting portion, and a portion of the third reinforcement part which is exposed from the second support body in the second middle connection section is used as the keycap connecting portion.

11. A keyswitch structure, comprising:
- a base plate;
- a keycap, extending lengthwise in a lengthwise direction; and
- a keycap support mechanism, the keycap support mechanism supporting the keycap above the base plate in a vertical direction, the vertical direction being perpendicular to the lengthwise direction, the keycap support mechanism comprising:
  - an outer support; and
  - an inner support, the outer support and the inner support being pivotally connected around a rotation axis, the rotation axis being parallel to the lengthwise direction, the outer support surrounding the inner support, the inner support comprising a first support body and a first reinforcement part, the first reinforcement part being embedded into the first support body, an elastic modulus of the first reinforcement part being greater than an elastic modulus of the first support body, the inner support defining a first side connection section on both sides of the inner support in the lengthwise direction, each first side connection section comprising at least one base plate connecting portion and at least one keycap connecting portion, the first reinforcement part extending into the two first side connection sections, wherein the outer support and the inner support are connected to and between the base plate and the keycap, and in each first side connection section, the at least one base plate connecting portion is connected to the base plate, and the at least one keycap connecting portion is connected to the keycap.

12. The keyswitch structure according to claim 11, wherein in one of the first side connection sections, a sum of the at least one base plate connecting portion and the at least one keycap connecting portion is greater than or equal to three in number.

13. The keyswitch structure according to claim 12, wherein the inner support comprises a second reinforcement part, the second reinforcement part is embedded into the first support body and extends into the two first side connection sections.

14. The keyswitch structure according to claim 13, wherein the first reinforcement part and the second reinforcement part are located at two sides of the rotation axis.

15. The keyswitch structure according to claim 14, wherein the first reinforcement part and the second reinforcement part have a same material and are structurally symmetrical with respect to the rotation axis.

16. The keyswitch structure according to claim 11, wherein the first support body is a polymer part, and the first reinforcement part is a metal bar.

17. The keyswitch structure according to claim 16, wherein the first reinforcement part has at least one bent portion, located in one of the first side connection sections.

18. The keyswitch structure according to claim 11, wherein the inner support defines a first middle connection section in the lengthwise direction, the first middle connection section is located between the two first side connection sections in the lengthwise direction, and the first middle connection section comprises a base plate connecting portion or a keycap connecting portion.

19. The keyswitch structure according to claim 11, wherein the outer support comprises a second support body and a third reinforcement part, the third reinforcement part is embedded into the second support body, an elastic modulus of the third reinforcement part is greater than an elastic modulus of the second support body, the outer support defines a second side connection section on both sides of the outer support in the lengthwise direction, each second side connection section comprises at least one base plate connecting portion and at least one keycap connecting portion, and the third reinforcement part extends into the two second side connection sections.

20. The keyswitch structure according to claim 19, wherein the outer support defines a second middle connection section in the lengthwise direction, the second middle connection section is located between the two second side connection sections in the lengthwise direction, the second middle connection section comprises a keycap connecting portion, and a portion of the third reinforcement part which is exposed from the second support body in the second middle connection section is used as the keycap connecting portion.

* * * * *